July 31, 1928.
F. BRIGGS
1,678,632
SCRAPPLE PACKAGE
Filed Oct. 11, 1926
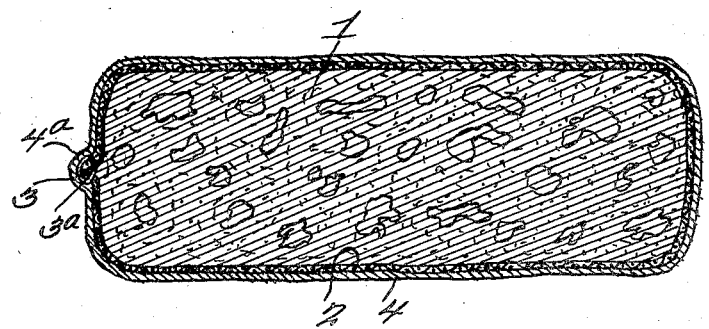
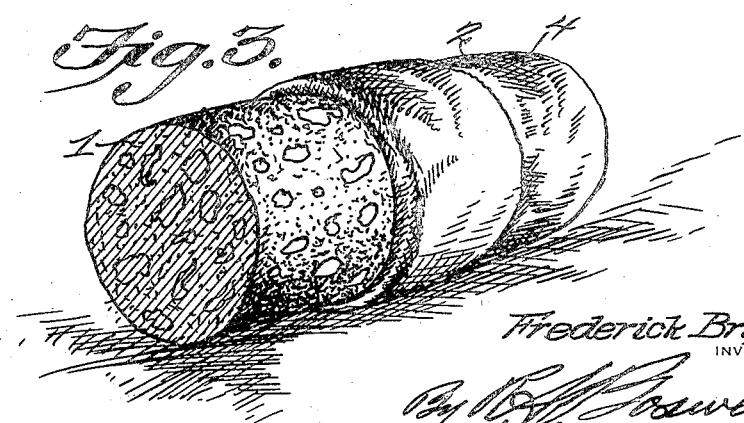
Frederick Briggs
INVENTOR,
ATTORNEY Patented July 31, 1928.

1,678,632

UNITED STATES PATENT OFFICE.

FREDERICK BRIGGS, OF WASHINGTON, DISTRICT OF COLUMBIA, ASSIGNOR TO BRIGGS PACKING CO., OF WASHINGTON, DISTRICT OF COLUMBIA, A CORPORATION OF DELAWARE.

SCRAPPLE PACKAGE.

Application filed October 11, 1926. Serial No. 140,932.

The present invention relates to the food product known as scrapple which is made by cooking the meat in boiling water in a kettle, the water thoroughly covering the meat. When the meat is thoroughly and properly cooked, it is removed from the water and chopped fine and then it is put back in the juice in the kettle and boiled while cereal and seasoning are added. This mixture is thoroughly cooked until the cereal jellies, then the mixture is removed from the water while hot and placed in suitable receptacles, such as tin pans or the like, and permitted to cool.

It is realized that this method is very unsatisfactory as the hot scrapple by cooling in the pans forms a crust on the top due to being exposed to the air and thereby acting to prevent the steam or vapor from escaping from the top of the scrapple. However, some of the steam or vapor may escape at the sides of the pan but the major portion of the steam or vapor condenses at the sides and finds its way to the bottom of the pan. This moisture soaks the under surface of the scrapple and in a very short time, more especially in extremely warm weather, causes the cereal to sour, and furthermore the bottoms and sides of the pans very often rust, in which case they are of no further use for this purpose.

The present invention has for its purpose to produce a scrapple package wherein these disadvantages are eliminated by resorting to a more sanitary and economical method of placing the scrapple in containers. For instance, the scrapple while hot, subsequently to being removed from the kettle, is stuffed in suitable porous containers, such as cotton bags, in which case the steam or vapor is allowed to escape from around the entire surface of the bag, the scrapple quickly cooling and, subsequently to being cooled, it may be suspended in a smoke house and cold smoke applied, though not necessarily, but which adds to the flavor and provides a preservative.

Another purpose of the present method is to render the containers or bags impervious to air, whereby the contents of the container or bag may be kept for a substantial period.

As is obvious, the bags of scrapple may be coated with paraffin without subjecting the package to cold smoking.

This particular process renders it possible for scrapple packages to be shipped great distances without souring or otherwise spoiling. It is also possible with this particular process to manufacture scrapple packages in hot climates as well as in cold climates and ship the same from one to the other and vice versa, the contents of the bags being in the same condition when the bags are opened as when first placed in the bags, the scrapple retaining its flavor all the while.

Obviously, the shipping of scrapple in bags subsequently dipped in a coating of paraffin keeps the product more sanitary and furthermore the entire process is more economical, and due to the stuffing of the scrapple in bags, it is possible to smoke the scrapple which cannot be accomplished by any other known process, the smoking adding to the flavor and constituting a preservative, and since the bag is rendered impervious, the scrapple is not exposed to the air nor does it come in contact with any metal.

In using a scrapple package, the bag may be easily opened at one end by removing a suitable stitching, and the bag may then be peeled back over the sides of the scrapple which is relatively dry but not enough to cause the scrapple to crumble or break. The scrapple may be easily cut in slices and fried or baked as the case may be, there being absolutely no excess moisture which might cause the scrapple to sour or otherwise spoil.

It is known that meats have been packed in bags, such as Taylor's pork roll, and it is also known that mush has been placed in paper wrappers, an inner one and an outer one, and obviously there is no attempt to resort to broad claims.

However, the present invention enables scrapple packages to be put up more economically, kept for a long time and allowed to be shipped to distances, the article being prevented from souring and generally producing a much better article of food.

It is to be understood that the particulars herein given are in no way limitative and that, while still keeping within the scope of the invention, any desired modifications of details and proportions may be made in the product according to the circumstances.

The invention comprises further features and combinations of parts to be hereinafter set forth, shown in the drawings and claimed.

In the drawings:

Figure 1 is a view in perspective of a scrapple package.

Figure 2 is a sectional view through the same.

Figure 3 is a view of the package, one end having been opened and the bag being partly peeled back over the sides of the scrapple, whereby the scrapple may be cut off in slices.

As previously set forth, the scrapple is cooked in the usual way and while in a thoroughly hot condition it is stuffed in suitable porous cotton bag 2, the scrapple being designated by the numeral 1. The scrapple is allowed to thoroughly cool, the steam or vapor escaping through the walls of the bag, and after the bag of scrapple has thoroughly cooled, the open end 3 of the bag having been stitched together as at 3ª, the bag of scrapple may, though not necessarily, be subjected to a cold smoking which adds flavor and acts as a preservative.

After subjecting the bag of scrapple to a cold smoke, though it may be dispensed with, the outer surface of the bag is supplied with a suitable impervious coating 4, preferably paraffin. This coating is impervious to air which permits the scrapple to be kept for a long time and enables it to be shipped great distances.

This invention, in its broadest aspect, has for its essential feature to provide an improved food package and a process of producing the same.

Really, the first step is to cook the article of food;

Then, stuffing the article of food while hot in a porous container, such as a cotton bag;

Then, due to the bag being porous, owing to the cotton material, the article of food quickly cools, which avoids any condensation of the steam settling within the article of food or around its surface. In other words, the steam or vapor easily and quickly escapes.

Then the article of food within the bag may, though not necessarily be subjected to a cold smoking, which adds to the seasoning and assists as a preservative, as well as producing a very desirable flavor. This step is not absolutely necessary, but is a new step in making an article of food, preferably scrapple, mush, hominy and the like.

Then, subsequent to closing the open end of the cotton bag, the bag with the food therein is supplied with a coating, preferably of paraffin wax or the like, rendering the bag impervious to the exterior atmosphere, enabling the food package to be shipped a great distance, since the coating of paraffin prevents the article of food within the bag from spoiling. Though it may not be shipped, it may be kept for a long time and still retain its original flavor with absolutely no chance of spoiling.

Certain articles of food have been placed in paper wrappers, but only after the food has cooled, such wrappers consisting of inner and outer layers, the ends of the inner layer being open; and it is to be borne in mind that there is no conflict between this character of food package and the present food package within the cotton bag, the food being placed in the bag while hot, and the steam or vapor and moisture escaping through the pores of the bag; and furthermore it is to be borne in mind that there is no claim which may conflict or may tend to include a food article which is first cooled and then placed in paper wrappers.

The invention having been set forth, what is claimed is:

1. A steamed and cold smoked scrapple package comprising a porous fabric bag containing the scrapple, the porous mesh of the bag permitting the escape of steam or vapor and permitting the cold smoke to penetrate the scrapple, and an exterior coating impervious to air.

2. A new process for producing scrapple packages, consisting in stuffing the scrapple, while hot, in porous textile bags, the steam or vapor being permitted to escape, thus quickly cooling the scrapple, and then subsequently applying to the exterior surface of the bag a coating of air-impervious material.

3. A new process for producing scrapple packages, consisting in stuffing the scrapple, while hot, in a porous textile bag, allowing the scrapple to quickly cool, the steam or vapor escaping through the walls of the bag, subjecting the bag of scrapple to a cold smoke, and then subsequently subjecting the exterior surface of the bag to an air-impervious coating.

In witness whereof the inventor's signature is hereunto affixed.

FREDERICK BRIGGS.